UNITED STATES PATENT OFFICE.

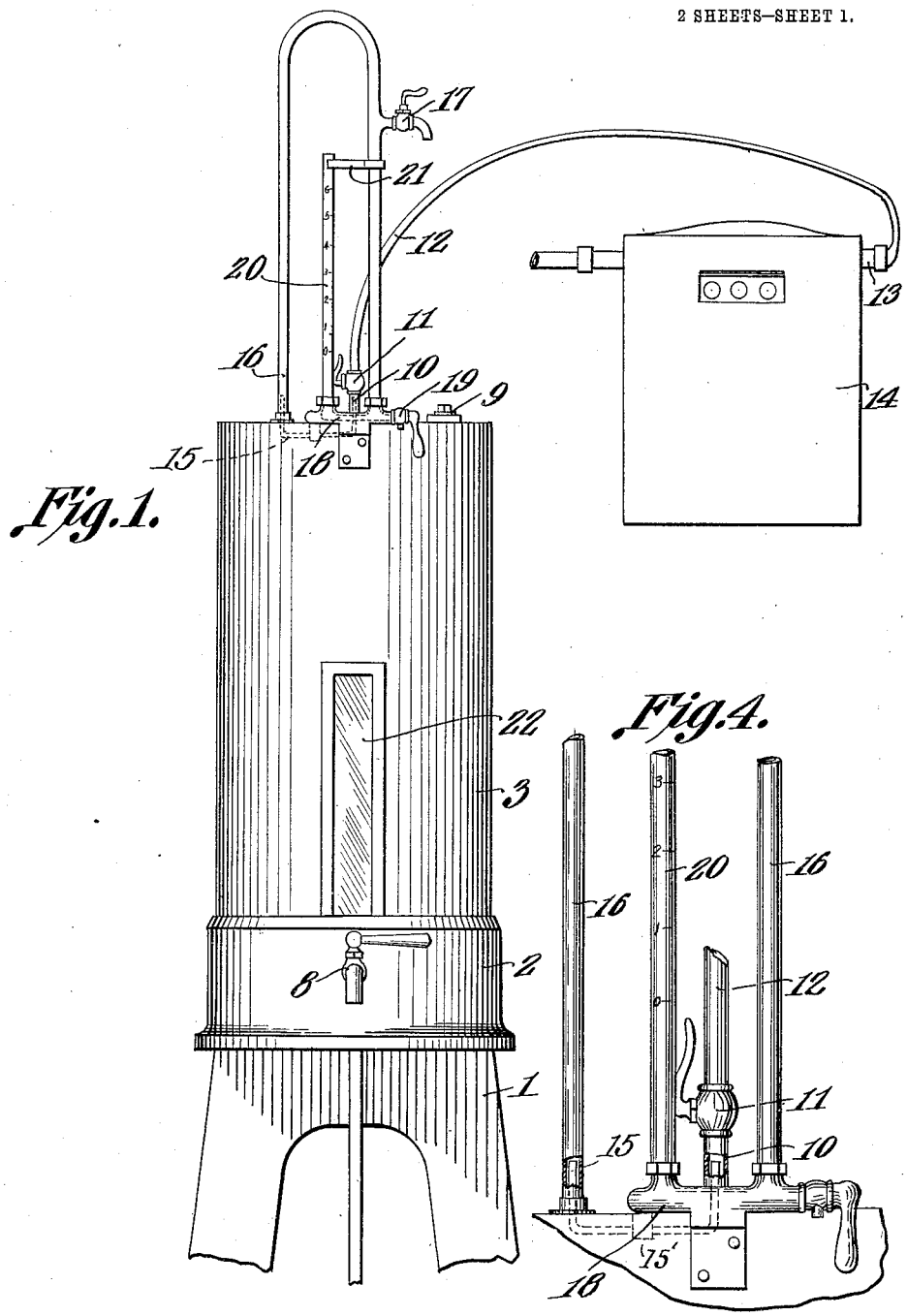

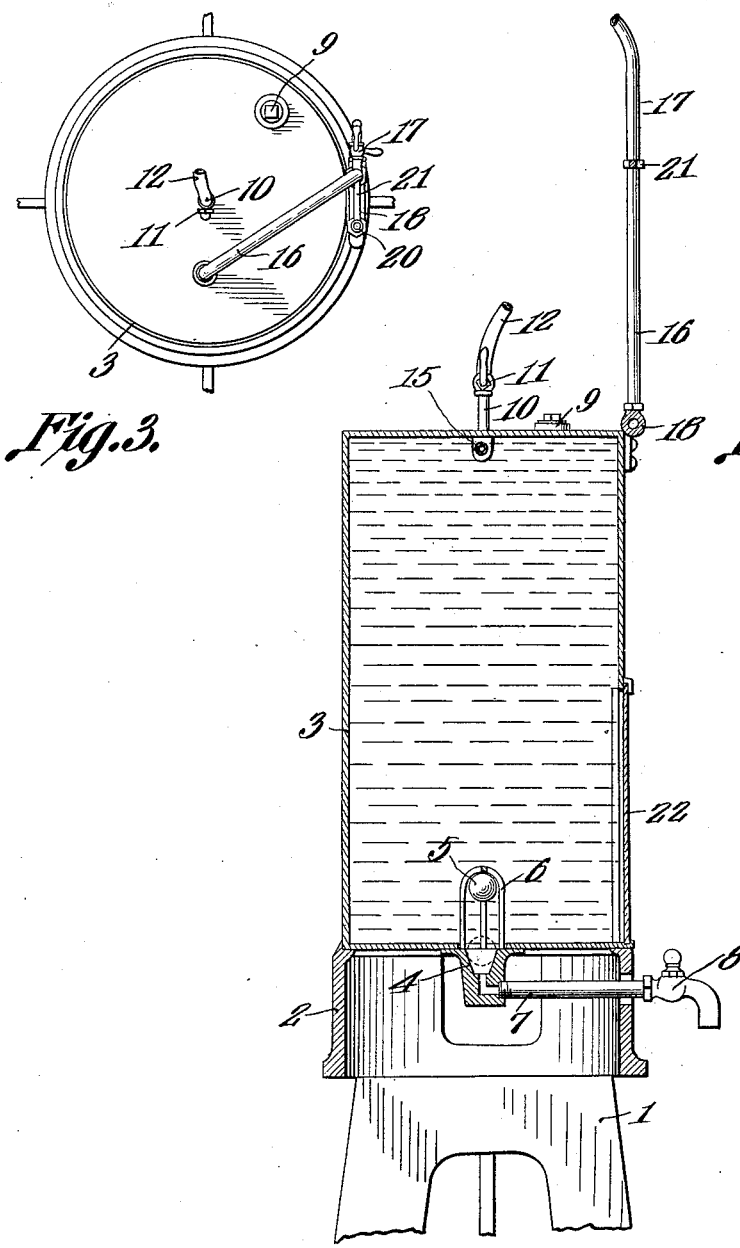

GUSTAVUS W. ANDERSON, OF GALESBURG, ILLINOIS.

GAS-METER-TESTING DEVICE.

1,097,834.

Specification of Letters Patent.

Patented May 26, 1914.

Application filed November 5, 1913. Serial No. 799,355.

*To all whom it may concern:*

Be it known that I, GUSTAVUS W. ANDERSON, a citizen of the United States, residing at Galesburg, in the county of Knox and State of Illinois, have invented a new and useful Gas-Meter-Testing Device, of which the following is a specification.

The present invention relates to improvements in a gas meter testing device, one object of the present invention being the provision of a simple portable testing device, which may be connected to test the meter without the disturbing of the same relatively to the installation of the same, thus providing a means which may be carried from place to place and not necessitate the detachment of the meter and the carrying of the meter to the point of testing as is the usual practice.

A further object of the present invention is the provision of a testing device of this character, and for this purpose, which is composed of a few number of parts, and which by the ordinary mechanic or gas meter tender may be readily operated to ascertain the exact condition of the meter without as before stated, disturbing the installation of the same relatively to the piping of the house or building.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a front elevation of the complete tester in the position it assumes when testing the meter. Fig. 2 is a vertical central sectional view of the complete tester. Fig. 3 is a top plan view thereof. Fig. 4 is an enlarged detail view of the inverted U-shaped pipe and its coupling support.

Referring to the drawings, the numeral 1 designates a stand, which may be taken indicative of any support by means of which the base 2 and the cylindrical receptacle 3 may be supported. In practice, this receptacle 3 is designed to receive the amount of gas that it may be desired to measure, as for instance, one, two or more cubic feet, and before measuring the same is filled to its capacity, with one, two or more cubic feet of water.

A drain connection 4 is connected in the lower central portion of the receptacle and is controlled by the buoyant ball valve 5, which is limited in its upward movement when the tank is filled with water by means of the retaining rods 6. A pipe 7 is connected to the outlet of the member 4, and has attached thereto, the valve or faucet 8, by means of which the tank 3 may be emptied when desired, and as will presently appear. Disposed in the upper end of the tank 3 is a filling cap 9, by means of which the tank 3 is filled with water when desired.

A pipe 10 is connected to the upper end of the receptacle 3, and has disposed therein the manually controlled valve 11, a flexible tube 12 being connected to the valve 11 and to the outlet 13 of the gas meter 14, or to a jet adjacent to the gas meter, as may be found most convenient.

A U-shaped air tube 15 is supported by a bracket 15', and has its terminals introduced into the lower ends of the pipes 10 and 16, and thus above the water line of the tank 3 when the tank is filled with water. By this arrangement, the gas pressure will properly register in the gage 20. The opposite terminal of the inverted U-shaped tube or pipe 16 is connected to the coupling member 18, which is provided with the valve controlled outlet 19, and disposed in the pipe 16 at any point desired, preferably above the upper end of the glass gage 20, is a manually controlled venting valve 17. Connected to the opposite end of the coupling 18 is the vertically disposed gage and sight tube 20, which is assisted in being supported in an upright position by means of the bracket or clip 21 connected to one terminal of the pipe 16.

Mounted in the side wall of the receptacle 3 at a point extending from the bottom to any desired distance thereabove, is the sight glass 22, by means of which the contents of the tank may be observed from the outside, and the purpose of which will presently appear.

In operating the present invention, the tank 3 is filled to its capacity, the valve 8 being closed and the plugged inlet 9 also being closed. The flexible tube 12 is now connected to the outlet of the meter or the outlet of a jet (not shown), and the valve 11 is opened. Before the valve is opened, however, the tank is filled, and there is water for registering, maintained within the tube 20 and the connecting end of the tube 16 at all times and normally at the point zero in the tube 20, so that as the gas is admitted into the upper end of the tank, the water in the tubes 16 and 20 is displaced and consequently such displacement is indicated by the figures upon the gage tube 20. The pressure under which the gas is flowing will be indicated by the gage marks upon the tube 20, as for instance, the water rising within the tube, two and a half inches, would be termed as 25 tenths pressure, and three inches would be termed 30 tenths pressure, etc. As soon as the gas pressure has been indicated at its maximum in the glass tube 20, the faucet or valve 8 is opened, and a sufficient amount of water is released to permit the water to fall to zero upon the tube 20 and the water is held at that point by regulating the intake of the gas, and the outflowing of water from the tank 3 during the entire test, where there will be neither pressure nor a vacuum formed during the following test. The gas is permitted to enter through the tube 12, and when the indicator hand upon the meter 14, indicates that the proper amount of gas has been admitted to the tank 3, as for instance, one foot, there being a cubic foot of water within the tank 3, the faucets 8 and 11 are simultaneously closed, and should any water remain within the tank, it would indicate that the meter is operating "fast." If, however, no water remains within the tank 3, this indicates that the meter is operating "slow." In other words, it is desired after the pressure has been obtained within the tank, that there will be an equal amount of gas entering the tank as there is water running out of the faucet 8. Therefore, should the tank 3 be emptied simultaneously with the cutting off of the valve 11 and the valve 8, it would indicate that the meter was accurate, while should any water remain, it would indicate that the meter is operating, as before stated "fast." By means of the buoyant ball valve 5, it is evident that when practically all of the water has flowed through the pipe 7, and out of the faucet 8, that the port 4 from the tank will be automatically closed, to be opened as soon as the water poured through the tap or plug inlet 9, will have reached sufficiently high to float the ball. The frame 6, as before described, is the means to limit the upward movement of the ball and retain the same so that it will properly close the port 4 when the water has been emptied from the tank 3. The valve 17 when opened will release the gas pressure so that the gas pressure can be ascertained as many times as may be deemed necessary, while the valve 19 is to balance the water in the glass tube 20. That is if too much water is in the tube 20, the valve 19 is manipulated so that the water is permitted to stand at zero in the tube 20. Thus with this apparatus the final measuring of the gas is done with the gas at atmospheric pressure.

What is claimed is:

1. A portable gas meter testing device, including a tank, a valve controlled drain therefor, a U-shaped air tube within at a point adjacent the top of the tank and having its terminals above the extreme liquid level, an inverted U-shaped tube having one terminal in connection with one end of the first tube, a sight pressure gage connected to the other terminal thereof to indicate the pressure of the tank, a valve controlled conduit connected at the highest point of the tank for directing gas into the tank, the outlet end thereof having inserted therein, the remaining terminal of the first U-shaped tube, and a sight gage connected to the tank adjacent the lower portion thereof to indicate the amount of liquid within the tank.

2. A portable gas meter testing device, including a tank, a valve controlled drain therefor, a U-shaped air tube within at a point adjacent the top of the tank and having its terminals above the extreme liquid level, an inverted U-shaped tube having one terminal in connection with one end of the first tube, a sight pressure gage connected to the other terminal thereof to indicate the pressure of the tank, a valve controlled conduit connected at the highest point of the tank for directing gas into the tank, the outlet end thereof having inserted therein, the remaining terminal of the first U-shaped tube, a sight gage connected to the tank adjacent the lower portion thereof to indicate the amount of liquid within the tank, and a buoyant valve for automatically closing the drain when the tank is empty.

In testimony that I claim the foregoing as my own, I have hereto affixed my signature in the presence of two witnesses.

GUSTAVUS W. ANDERSON.

Witnesses:
    A. J. ANDERSON,
    W. W. WILLIAMSON.